Sept. 4, 1962 G. MOUNTJOY 3,052,869
OBSTACLE DETECTION SYSTEM
Filed Sept. 8, 1958
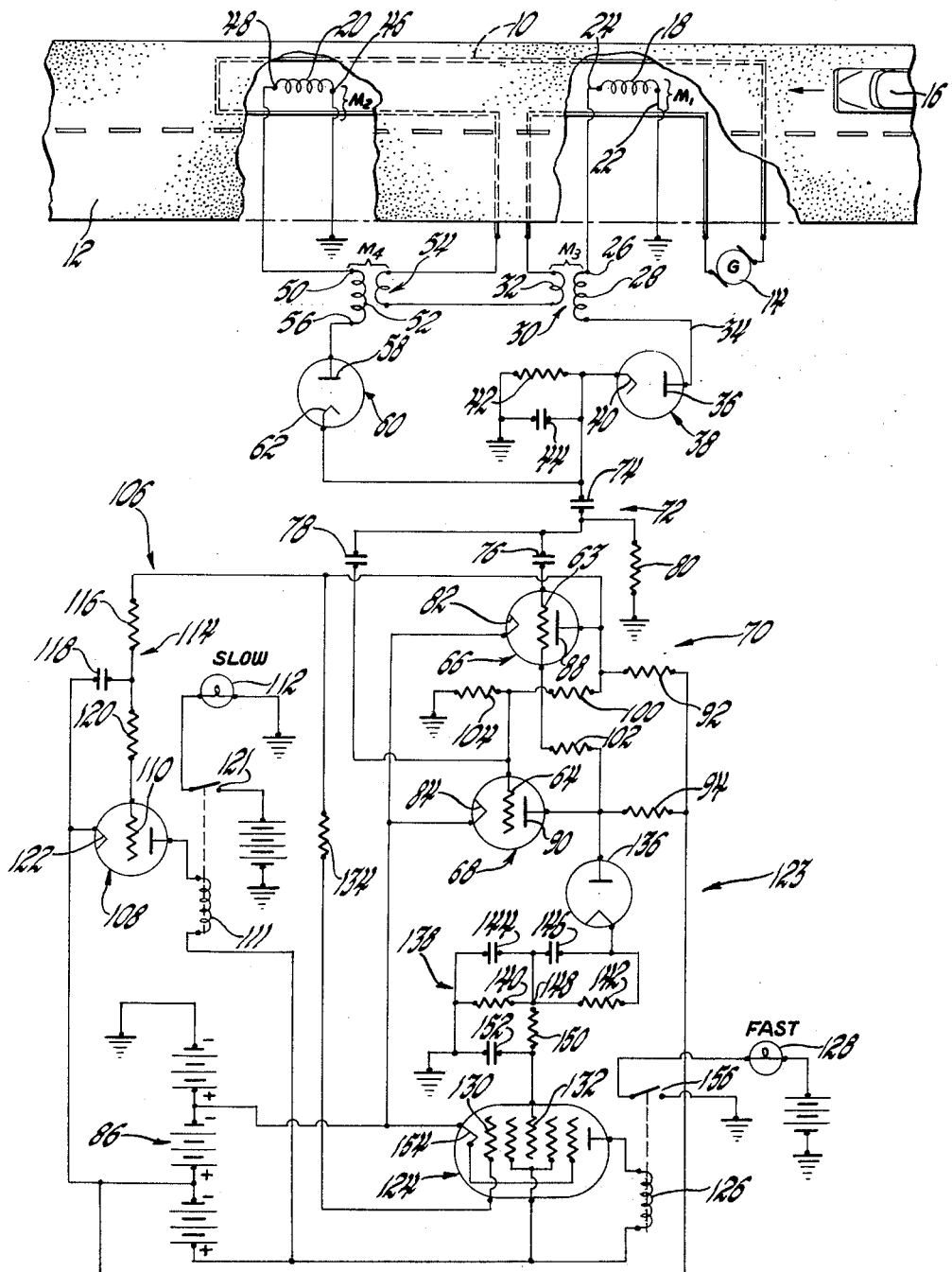
INVENTOR.
Garrard Mountjoy
BY
D.R. Sadler
ATTORNEY United States Patent Office 3,052,869
Patented Sept. 4, 1962

3,052,869
OBSTACLE DETECTION SYSTEM
Garrard Mountjoy, Little Rock, Ark., assignor to General Motors Corporation, Detroit, Mich., a corporation of Delaware
Filed Sept. 8, 1958, Ser. No. 759,786
8 Claims. (Cl. 340—38)

The present invention relates to means for automatically controlling automotive vehicles and, more particularly, to means for detecting the presence of any potentially hazardous obstacles in the path of an automatically controlled vehicle traveling over a roadway.

At the present time a considerable amount of effort is being devoted towards the development of a practical system for automatically controlling the operation of automotive vehicles traveling on a roadway. It is the object of such systems to relieve the drive or operator of all control of his vehicle when it is being regulated by the system. Although the operator may be able to immediately assume complete control of his vehicle, his attention will normally not be directed toward the operation of the vehicle. As a result, the operator cannot be relied upon to detect and avoid any obstacles in the path of his vehicle and, accordingly, any automatic control system must be able to reliably detect such obstacles. Numerous arrangements have been proposed to scan the path of the vehicle with beams of light, sound, radar, infrared, etc. Unfortunately, such systems have not been able to discriminate between obstacles that are actually in the path of the vehicle and those which are not. In addition, the foregoing systems have been unable to distinguish between stationary obstacles such as an inoperative vehicle, a moving obstacle such as a vehicle traveling at a slow rate of speed and/or overtaking obstacles such as excessively high speed vehicles approaching from behind.

It is now proposed to provide a system for automatically regulating a vehicle traveling on a roadway which is capable of sensing the presence of any stationary and/or moving obstacles that would be hazardous to the controlled vehicle. More particularly, this is to be accomplished by providing a control cable which is disposed in the roadway along the path which the vehicle is to follow and spaced pickups positioned in proximity to the control cable so as to be loosely coupled thereto. The pickups are preferably interconnected with each other so that the outputs therefrom will be opposed and will normally be balanced so as not to cause any indications. However, in the event an obstacle is present in the path of the vehicle, it will affect the degree of coupling between the control cable and one or more pickups. This, is turn, will affect the voltage induced in the pickup and, as a consequence, will cause a voltage to appear in the output of the pickups.

If a vehicle is traveling along the prescribed path at the designated command or controlled speed, the period required for the vehicle to travel between the pickups will be a predetermined amount and the interval between the output pulses from the pickups will correspond to this period. Since such a vehicle presents no obstacle to the controlled vehicle, no indication will be made. However, if the period is less than or is longer than this predetermined amount, any controlled vehicles present will overtake the slow vehicle or will be overtaken by the following vehicle. Since both of these conditions are hazardous, an indication will be made that will cause the operator or the control system to take appropriate action to avoid an accident.

The FIGURE is a schematic representation of an obstacle and/or speed measuring system embodying the present invention.

Referring to the drawing in more detail, the present invention is adapted to be embodied in an automatic vehicle controlling system such as disclosed and claimed in my copending application S.N. 756,827, filed August 25, 1958, assigned to the assignee of the present invention. In such a system a control cable 10 is buried beneath the surface of the roadway 12 and is provided with an alternating current by a generator 14 that causes an electromagnetic field to be radiated above the surface of the road 12 to form a guidance signal for controlling the vehicle 16. The vehicle 16 to be controlled is equipped with one or more pickups that are adapted to be disposed in the magnetic field to thereby sense the radiated guidance signal and to steer the vehicle 16 along the path defined by the cable 10. Although the frequency of the current may be any desired amount, it preferably is above the audio range and below the radio frequency range to thereby reduce the possibility of interference with radios, etc. A frequency of approximately 20 kc. has been found to provide a satisfactory guidance signal. In addition to guiding the vehicle 16 along a predetermined path, it is desirable for the system to include means for causing all of the vehicles on the path to travel at a predetermined command speed.

Since there may be vehicles 16 on the roadway 12 which are not automatically controlled, they may be traveling above or below the command speed. In addition, the automatic control system may permit a limited amount of variation in the speed of the vehicles which are supposedly traveling at command speed. In order to detect the presence of such moving obstacles and, in addition, any stationary obstacles such as a stalled vehicle, each section of the roadway 12 may be equipped with at least a pair of pickup coils 18 and 20 that are located in the vicinity of the guidance cable 10. In the present instance each of these pickups 18 and 20 comprises an inductive coil that is buried under the surface of the roadway 12 within the alternating electromagnetic field radiated from the cable 10. As a result, each of the pickup coils 18 and 20 will have a voltage induced therein which is dependent upon the voltage in the control cable 10, the degree of coupling $M_1$ and $M_2$ (which is loose) etc. The first pickup 18 has one side 22 grounded while the other side 24 is connected to one end 26 of a secondary 28 of a transformer 30 having a primary 32 that carries a current corresponding to the current in the cable 10. The coupling $M_3$, turns ratio, etc. of this transformer 30 are such that the output of the secondary 28 will oppose the voltage in the pickup coil 18. Normally, the two voltages will be equal to each other and no current will flow therethrough. The opposite end 34 of the secondary 28 is connected to the plate 36 of a diode tube 38 having the cathode 40 thereof grounded by means of a resistor 42 and condenser 44.

The other pickup coil 20, which is similar to the first coil 18, has one side 46 grounded while the other side 48 is also connected to one end 50 of a secondary 52 of a transformer 54 similar to the first transformer 30. These are arranged so that the induced voltages will normally be equal and opposite and no current will flow in either of the coils 20 or 52. The opposite end 56 of the secondary 52 is, in turn, connected to the plate 58 of a second diode 60. The cathode 62 of this diode 60 is connected to the cathode 40 of the first diode 38 so that they are both grounded through the same R.-C. circuit.

It may thus be seen that, normally, there will be substantially no current flow through either of the pickup coils 18 or 20 or the diodes 38 or 60. Consequently, the condenser 44 will be discharged and there will be no voltage thereacross. However, if an obstacle is in proximity to one of the pickups 18 or 20, the degree of coupling $M_1$ or $M_2$ between the pickup 18 or 20 and the cable 10 will change. As a result, the voltage in the pickup coil 18 or 20 will no longer be balanced by the voltage in the secondary 28 or 52 and a current will flow through the diodes 38 or 60 and charge the condenser 44 to some potential. As soon as the diode stops conducting, the charge on the condenser 44 will be dissipated through the resistor 42. It should be noted that a moving vehicle 16 will only temporarily unbalance the pickup coils 18 and 20 and will thus produce a pulse on the condenser 44 each time it passes over a pickup coil.

The potential across the R-C circuit grounding the cathodes 40 and 62 of the diodes 38 and 60 is capacitively coupled to the control grids 63 and 64 of both tubes 66 and 68 of a "flip-flop" circuit 70 of conventional Eccles-Jordan design. This coupling is accomplished by means of a D.C. filter 72 consisting of condensers 74, 76 and 78 and a grounding resistor 80 so that only the rate of change in the charging of the condenser 44 will be applied to the control grids 63 and 64. Thus in the event of a disturbance of the coupling $M_1$ or $M_2$ of one of the pickups 18 and 20, a sharp pulse will appear on the control grids 63 and 64.

The so-called "flip-flop" circuit 70 includes an input tube 66 and an output tube 68 that have their cathodes 82 and 84 at a fixed positive potential relative to the ground by means of batteries 86. The plates 88 and 90 are connected to a higher positive voltage or battery 86 by means of plate load resistors 92 and 94. The control grids 63 and 64 of each tube 66 and 68 are connected to the plates 88 and 90 of the other tube by means of resistors 100 and 102. Thus, whenever one tube 66 or 68 is conducting, the reduced plate voltage of that tube will cause the control grid of the other tube to be biased to cut-off. Thus, only one tube at a time can be conductive. The grid bias resistor 104 will cause the second tube 68 to be normally conductive and the first tube 66 is normally non-conductive.

In order to determine when a vehicle has stalled in the roadway 12 so as to form a stationary obstacle or is moving at less than the command speed so as to form a moving obstacle, a slow circuit 106 is provided. This circuit 106 includes a triode 108 that has a relay 111 in the plate circuit thereof for actuating a warning lamp 112. The warning lamp may be located alongside the roadway 12 to be conspicuous to the vehicle operator. In addition, means, such as disclosed and claimed in copending application S.N. 759,522, filed September 8, 1958, assigned to the assignee of the present invention, may also be provided that will be actuated simultaneously with the lamp 112 to automatically prevent an accident. For example, the current may be removed from the control cable 10 so as to stop all vehicles in the section. The grid 110 of the triode 108 is connected to a time delay circuit 114 having a resistor 116 and a condenser 118 by means of a resistor 120. The cathode 122 of the triode 108 is connected to an intermediate potential or battery 86, while the plate relay 111 is connected to a higher potential. Normally, the input tube 66 will not be conducting and the potential of plate 88 will be high. The condenser 118 will then have an adequate charge to maintain the grid 110 biased for conduction of the triode 108. This will retain the relay 111 energized and the contacts 121 open so that the warning lamp 112, etc. will be shut off. In the event the input tube 66 commences conducting, the plate 88 potential will fall and the charge on the condenser 118 will discharge through the resistor 116 and cause the bias on the grid 110 to fall toward cut-off.

It may thus be seen that, in the event a vehicle 16 passes a pickup 18 or 20, the input tube 66 will become conductive and the plate 88 voltage will drop below the cathode 122 potential and cause the condenser 118 to start charging negatively through the resistor 116. This process will continue until the vehicle 16 passes the other pickup 18 or 20 and causes the input tube 66 to become non-conducting so that the plate 88 potential will rise and cause the condenser 118 to become positively charged again. In the event the vehicle 16 is traveling at least as fast as the command speed, the period during which the condenser 118 is being negatively charged will be too short for the grid 110 potential to reach cut-off. Thus the relay 111 will always remain energized and no indication will be provided. However, if the period of time required for the vehicle 16 to traverse the distance between the two pickups 18 and 20 is sufficiently long for the condenser 118 to become sufficiently negatively charged to cut the triode 108 off, the relay 111 will be de-energized, the relay contacts 121 will close and the warning lamp 112, etc. will be turned on.

In order to determine when a vehicle 16 is traveling at greater than command speed and is in danger of overtaking a vehicle, a fast circuit 123 is provided. This circuit 123 includes a tube 124 which has a relay 126 in the plate circuit thereof for actuating a warning lamp 128 or causing an automatic action to take place to avoid an accident. The tube 124 is preferably a so-called pentagrid converter having a pair of separate control grids 130 and 132. When either one of these grids 130 or 132 is biased below its cutoff point, the tube 124 will not conduct irrespective of the bias on the other grid. The number one or first control grid 130 is connected directly to the plate 88 of the input tube 66 by means of a resistor 134. When the input tube 66 is not conducting, which is the normal condition, the potential on the plate 88 will be high and the grid 130 will be biased above its cut-off.

As a result, when the input tube 66 is not conducting, the plate current in the converter 124 will be controlled by the bias on the grid 132. However, if the input tube 66 does become conductive, the potential on the plate 88 will drop and cause the grid 130 bias to fall below cut-off and prevent the converter 124 from becoming conductive.

As a result, whenever the input tube 66 is conducting, the converter 124 will be cut-off and the second grid 132 cannot assume control of the plate current under any circumstances.

The second control grid 132 is coupled to the plate 90 of the output tube 68 by means of a diode 136 and condenser-resistor time delay network 138. This network 138 includes a pair of serially connected resistors 140 and 142 with a pair of condensers 144 and 146 disposed thereacross. The midpoint 148 between the condensers 144 and 146 and resistors 140 and 142 is connected to the second control grid 132 by a resistor 150. The resistor 150 is connected to ground by a condenser 152. Normally, the output tube 68 will be conducting and the plate 90 potential will be reduced. As a result, the condenser 144 will be lightly charged and will have a low potential thereacross. This potential will be transferred to the second grid 132 by the resistor 150 and condenser 152. Thus, normally, although the first grid 130 is biased for conduction, the elevated potential of the converter cathode 154 will cause the second control grid 132 to be biased below cut-off and the converter 124 will not conduct. Accordingly, the contacts 156 will be open and the warning lamp 128, etc. will not be energized.

Whenever the circuit 70 is triggered so that the output tube 68 becomes non-conducting, the plate 90 voltage will become high. Current will then flow through the diode 136 and charge the condenser 144 through the other condenser 146. This charge will be adequate to cause the bias on control grid 132 to become conductive. However, the charge will proceed to leak off through the resistor 140 and the combination of condenser 152 and resistor 150 so that the potential on the grid 132 will fall until the grid 132 becomes non-conductive. The period of time required for the cut-off point to be reached is equal to the period for a vehicle traveling at command speed to travel from pickup 18 to pickup 20. When the vehicle passes the second pickup, it will cause the second tube 68 to again become conductive. Thus the plate potential will drop and discharge condenser 144 and thus bias the grid 132 below cut-off.

It may thus be seen that when a vehicle passes the first pickup a pulse will be produced that will trigger the flip-flop circuit so that the input tube will become conductive. The potential on the plate 88 will fall and the condenser 118 will commence to charge negatively. In addition, the grid 130 will simultaneously be biased to cut-off and the condenser will be charged to above the cut-off for the grid 132 and commence discharging through resistor 140 and resistor 150-condenser 152. When the vehicle 16 passes the second pickup 20, a second pulse will be produced that will restore the flip-flop circuit 70 to its original condition. In the event this period was less than the period for a vehicle traveling at command speed to traverse the distance, the condenser 152 will not have discharged below cut-off. Thus, when the grid 130 becomes conductive, the converter tube 124 will become conductive and energize the relay 126 and light the lamp 128. If the period is longer than required for command speed the condenser will have discharged below cut-off and the converter will not conduct. However, if the period is greater than the prescribed amount, the charge on condenser 118 will be below cut-off and the triode 108 will stop conducting. Relay 111 will then close contacts 121 and illuminate slow warning lamp 112.

It is to be understood that, although the invention has been described with specific reference to a particular embodiment thereof, it is not to be so limited since changes and alternations therein may be made which are within the full intended scope of this invention as defined by the appended claims.

What is claimed is:

1. In a roadway having a transmission line radiating an electromagnetic field therefrom, means for determining the presence of an obstacle on said roadway whenever said obstacle is traveling at a speed other than some predetermined speed, said means comprising a pair of inductive coils that are disposed within said field to thereby be inductively coupled to said transmission line and having a signal induced therein, the coupling between said coils and transmission line being responsive to the presence of any objects on the roadway whereby the induced signals will be varied, an electrical switching circuit having two conductive conditions and being operatively interconnected with said coils and responsive to the variations in said signals to switch between said conductive conditions upon the occurrence of said variations, and means connected to said circuit effective to produce an output whenever one of said signals varies at other than some predetermined time interval after a variation of the other signal.

2. Means in a roadway for determining the presence of an obstacle on said roadway whenever said obstacle is traveling at a speed below some predetermined speed, said means comprising a pair of pickups that are disposed in said roadway and separated by some predetermined distance, each of said pickups being responsive to the presence of an obstacle on said roadway and effective to produce a signal whenever an obstacle is adjacent thereto, an electrical switching circuit operatively interconnected with said pickups and effective to switch between two conductive conditions in response to said signals, a time delay circuit connected to said switching circuit and having a condenser therein whose charge will vary at some predetermined rate, said time delay circuit being responsive to said conductive conditions for starting and stopping the variations in said charge, means responsive to the charge on said condenser for producing an indication whenever the charge changes by more than some predetermined amount.

3. Means for determining the presence of an obstacle traveling over a roadway at a speed in excess of some predetermined amount, said means comprising a pair of coils that are disposed in said roadway a predetermined distance apart, said coils having signals therein that vary as a result of the presence of an obstacle in proximity to said coil, an electrical switching circuit operatively interconnected with said inductive coils so as to be switched between two stable conductive condition by the changes in said signals, a normally non-conductive circuit operatively interconnected with said switching circuit and adapted to become conductive whenever the switching between said conductive conditions occurs within less than some predetermined time interval, and means responsive to conduction of said normally nonconductive circuit and adapted to produce an indication of the presence of a high speed vehicle on said roadway.

4. Means for determining the presence of an obstacle in a roadway comprising, a pair of pickups that are disposed in said roadway, each of said pickups being responsive to the presence of an obstacle on said roadway and effective to vary the output therefrom to form a signal indicating the presence of an obstacle, electrical switching means operatively interconnected with said pickups to be responsive to said variations in said outputs and effective to produce an output representative of the time interval between said variations, and indicating means connected to said switching means to be responsive to the output thereof and adapted to produce one indication in the event there are one or more variations in said outputs which do not occur within a predetermined time interval and another indication when they occur in less than said interval.

5. Means for determining the presence of an obstacle on a roadway comprising, a pair of pickups disposed in said roadway a predetermined distance apart and adapted to produce output signals upon the presence of an obstacle on said roadway in close proximity to said pickups, a bistable multi-vibrator having input means interconnected with said pickups to be responsive to said output signals and adapted to produce output pulses having a width equal to the time interval between said output signals, first timing means connected to receive said output pulses and effective to produce an indication whenever said time interval is less than a first predetermined value, and second timing means connected to receive said output pulses and effective to produce an indication whenever said time interval is greater than a second predetermined value.

6. In a system for determining the presence of an obstacle on a roadway, a pair of pickup devices disposed at spaced points along said roadway, each pickup device being adapted to produce an output pulse when an object is present on said roadway in proximity thereto, a bistable multivibrator circuit having first and second stages, each stage having an input connected to said pickup devices to receive said output pulses, said multivibrator circuit being adapted to switch conduction between said first and second stages when an output pulse occurs, a first timing circuit having an input connected to the output of said first stage and being adapted to produce an output voltage related to the voltage appearing at said input by a first function of time, a switching circuit connected to receive the output voltage of said first timing circuit and adapted to be actuated when said output voltage exceeds a predetermined value, a first indicator connected to said switching circuit and adapted to be energized thereby, a second timing circuit having an input connected to the output of said second stage and being adapted to produce an output voltage related to the voltage appearing at said input by a second function of time, a gating circuit having a first input connected to the output of said first stage and a second input connected to said second timing circuit to receive said output voltage, said gating circuit being adapted to be actuated only when said first stage is in a non-conductive state and the output voltage of said second timing circuit exceeds a predetermined magnitude, and a second indicator connected to said gating circuit and adapted to be energized thereby.

7. In a system for determining the presence of obstacles and vehicles on a roadway which are moving at other than a command speed, a first pickup device disposed at a point along said roadway, a second pickup device disposed at a point along said roadway spaced a predetermined distance downstream from said first pickup, each pickup device being adapted to produce an output pulse when an object is present on said roadway in proximity thereto, a bistable multivibrator circuit having first and second stages comprising amplifying devices each having load impedances and cross-coupling circuits interconnecting the load impedances and control elements thereof, each stage having an input connected to said pickup devices to receive said output pulses, said multivibrator circuit normally switching conduction from said second stage to said first stage when an output pulse is produced by said first pickup and from said first stage to said second stage when an output pulse is produced by said second pickup, a first timing circuit including a series resistor and capacitor connected across said load impedance of said first stage such that said capacitor will charge when said first stage is conducting, a switching circuit having an input connected across said capacitor of said first timing circuit and being adapted to be actuated when the charge thereon exceeds a value related to the time required by a vehicle to traverse said predetermined distance at said command speed, a first indicator connected to said switching circuit and adapted to be energized thereby, a second timing circuit including a capacitor which has a discharge path of preselected characteristics, said second timing circuit being connected to said load impedance of said second stage such that said capacitor will charge when said second stage is cut off, a gating circuit having a first input connected to said load impedance of said first stage and a second input connected across said capacitor in said second timing circuit, said gating circuit being actuated only when said first stage is non-conductive and the charge on said capacitor in said second timing circuit exceeds a value related to the time required by a vehicle to traverse said predetermined distance at said command speed, and a second indicator connected to said gating circuit and adapted to be energized thereby.

8. In a system for determining the presence of an obstacle on a roadway, a first pickup device disposed at a point along said roadway, a second pickup device disposed at a point along said roadway spaced a predetermined distance downstream from said first pickup, each pickup device being adapted to produce an output pulse when an object is present on said roadway in proximity thereto, a bistable multivibrator circuit having first and second stages, each stage having an input connected to said pickup devices to receive said output pulses, said multivibrator circuit normally switching conduction from said second stage to said first stage when an output pulse is produced by said first pickup and from first to second stage when an output pulse is produced by said second pickup, a first translating circuit being connected to the output of said first stage and having a predetermined time constant, a switching circuit connected to the output of said translating circuit and adapted to be actuated when the output thereof exceeds a predetermined value, a first indicator connected to said switching circuit and adapted to be energized thereby, a second translating circuit connected to the output of said second stage and adapted to produce an output voltage related to the output of said second stage by a function of time, a gating circuit having a first input connected to the output of said first stage and a second input connected to said second translating circuit to receive said output voltage and being adapted to be actuated when voltages are present at both of said first and second inputs, and a second indicator connected to said gating circuit and adapted to be energized thereby.

References Cited in the file of this patent

UNITED STATES PATENTS

| | | |
|---|---|---|
| 1,958,631 | Logan | May 15, 1934 |
| 2,532,231 | Jarvis | Nov. 28, 1950 |
| 2,877,454 | Zedlar | Mar. 10, 1959 |
| 2,883,108 | Thornton | Apr. 21, 1959 |

FOREIGN PATENTS

| | | |
|---|---|---|
| 147,646 | Sweden | Nov. 9, 1954 |